(12) United States Patent
Nelson (10) Patent No.: US 7,703,629 B2
(45) Date of Patent: Apr. 27, 2010

(54) BI-LATERALLY CLEANSING FUEL CAP

(76) Inventor: Eric A. Nelson, 13083-103 Wimberly Sq., San Diego, CA (US) 92128

( * ) Notice: Subject to any disclaimer, the term of this patent is extended or adjusted under 35 U.S.C. 154(b) by 1197 days.

(21) Appl. No.: 11/280,713

(22) Filed: Nov. 16, 2005

(65) Prior Publication Data

US 2007/0108212 A1 May 17, 2007

(51) Int. Cl.
*B65D 51/16* (2006.01)
(52) U.S. Cl. .............................. 220/371; 220/DIG. 33; 220/303; 220/304; 220/203.09; 220/203.19
(58) Field of Classification Search ................. 220/303, 220/DIG. 33, 371, 203.19, 203.23–203.26, 220/203.28, 203.29; 215/334, 217; 210/533, 210/399
See application file for complete search history.

(56) References Cited

U.S. PATENT DOCUMENTS

| 2,847,139 | A | * | 8/1958 | Christiansson et al. ...... 215/220 |
| 3,937,357 | A | * | 2/1976 | Burgess .................. 220/203.26 |
| 3,961,724 | A | * | 6/1976 | Kapsy ......................... 220/371 |
| 4,512,499 | A | * | 4/1985 | Uuskallio .................... 220/374 |

* cited by examiner

*Primary Examiner*—Robin Hylton
(74) *Attorney, Agent, or Firm*—Frank G. Morkunas (57) ABSTRACT

A fuel cap having a cap member with an internal chamber and a downward extending hollow tube in open communication with the internal chamber and in sealing communication with a lower hub bore; vents on side walls of the internal chamber; an absorption media inside the internal chamber below the vents and above the hollow tube; a hub rotatably and slidably connected to the cap member with the hub having a lower hub bore into which the hollow tube is translatable for releasing vapors from the fuel tank as necessary before re-fueling whereby the vapors pass through the absorption media where they are cleansed before being release out the vents.

14 Claims, 5 Drawing Sheets

BI-LATERALLY CLEANSING FUEL CAP

CROSS REFERENCES TO RELATED APPLICATIONS

Not applicable

STATEMENT REGARDING FEDERALLY-SPONSORED RESEARCH OR DEVELOPMENT

Not applicable

BACKGROUND OF THE INVENTION

This present invention relates to an improvement to a fuel cap, and more particularly to a fuel cap adapted to cleanse incoming ambient air and, upon re-fueling, protect the environment by cleansing escaping vapors from pollutants and other contaminants. In the past, most fuel caps for all fuel-powered objects (such as cars, trucks, motorcycle, motor boats, airplanes, and power lawn and gardening equipment, for example) merely were applied to the neck emanating from the fuel tank for the sole purpose of preventing loss of fuel during operation.

The Air Pollution Control Board (APCD) states that non-attainment areas for Ozone are serious problems all over the country. A non-attainment area is an area that is in noncompliance with the federal and/or state air quality standards. Currently, the most disconcerting component of smog is Ozone. Ozone is a strong irritant that can cause restriction of the airway, forcing the respiratory system to work harder in order to provide oxygen.

Chronic exposure reduces lung capacity, lowers stamina, and leaves people vulnerable to long-term respiratory problems. Smog is especially harmful for children whose lungs are still developing, senior citizens whose immune systems are weakening, and those who suffer from asthma and chronic lung disease. Gasoline vapor expelled during the fueling process is a major contributor to Ozone.

When cars are driven, fuel is delivered to the engine via a fuel pump. In most modern vehicles, fuel injection for example, high fuel pressures are necessary for the vehicles to operate properly. It is not uncommon for the fuel pressure regulator, in a modern vehicle, to operate at fuel pressures exceeding 35 psi. These pressures are created by high fuel pump flows delivering gasoline to the engine from the fuel tank. Typical modern fuel pump flows can exceed 30 gal per hour and even higher on performance cars. Since the fuel pump is providing more fuel to the engine than the engine can use (in order to maintain the required high pressures), the unused fuel is then re-routed back to the fuel tank.

This cycle continues to take place over and over and the rate of this cycle increases as the fuel level in the tank continues to decreases. For example, a typical car may be operating with about 5 gallons of fuel in the tank and the car has a fuel pump capable of pumping 30 gallons per hour to the engine. In this situation, the fuel in the tank is being pumped to the engine and back to the tank at least 6 times every hour.

Consequently, the same fuel is being cycled from the tank to the engine, and back to the tank over and over again. As previously mentioned, this high flow cycle is required to keep the fuel delivery systems operating at the proper fuel flows and pressures.

Typical engine temperatures, at the intake manifold (where the fuel is typically delivered) can range from about (160-240 degrees). Therefore, each time the fuel passes though the engine and is cycled back to the tank, the fuel is heated. This heated fuel, when it returns to the tank, raises the temperature of the gasoline in the tank. Once the gasoline in the tank has been heated, this then raises the temperature of the air/gas vapor (hydrocarbon vapor) in the tank. The higher temperature in the tank causes the vapors to expand and this expansion causes the internal pressures inside the fuel tank to rise.

This increased pressure causes the vapor release of Volatile Organic Compounds (VOCs) or "blow by" drivers experience when they remove the gasoline cap prior to refueling. Simply stated, during operation, the fuel in the tank travels from the fuel tank to the engine, then the unused fuel flows back to the tank. This cycle is continued and causes the fuel in the tank to be continuously heated. This heated fuel causes the fuel in the tank and its vapors to expand which raises the tank pressure or causes a positive pressure in the tank. Although this condition happens continuously during operation, the condition can be exasperated during hot summer days. When refueling is desired and the fuel cap is removed, the built-up pressure surges outward expelling vapors containing various pollutants and contaminants.

Various Air Resource Boards (ARB) report that motor vehicles contribute the biggest source of air pollution. Conventional gasoline-powered and diesel vehicles contribute more than 60 percent of the smog-forming pollutants. The ARB further state that Evaporative Emissions (emissions from evaporating gasoline, which occurs during vehicle fueling), can account for two-thirds of the hydrocarbon emissions released to the air from gasoline-fueled vehicles. Gasoline vapor is a volatile organic compound (VOC). Per the department of Washington State Air Toxic Sources, up to 9 grams per vapor gallon of concentrated VOC vapors are released when the gasoline cap is removed prior to refueling. Currently, in the state of California alone, there are approximately 27 million registered vehicles and nationally, according to the US Department of Transportation, there are approximately 225 million registered vehicles. Without the gas cap described herein, these vehicles, when their caps are removed for fueling, will vent, within the state of California, approximately 14,000 tons of raw pressurized VOCs and nationally approximately 109,000 tons of VOCs. Although some variations will persist between various design constraints, properly designed caps, as described herein, will cleanse approximately 95-99.7% of the pressurized VOC vapor contaminants normally released during cap removal as reflected in the numbers above. These numbers however do not include the additional vapor releases caused by boats, aircraft, off-road vehicles, lawnmowers, generators and other equipment as the cap described herein will also remove these contaminates.

Most gas caps for vehicles also have a venting capability which allows ambient air to pass through the cap and into the gas tank as the gas level drops and the air void above the gas increases. The ambient air entering the gas tank generally contains varying amounts of ambient moisture and other pollutants and contaminants. Such pollutants and contaminants (including moisture) can disrupt the efficiency of the motor and cause long-term damage to the motor.

The amount of moisture entering the gas tank, naturally, is much higher in more humid climates. The moisture ultimately condenses in the gas tank and mixes with the gas thereby decreasing the efficiency and performance of the vehicle and, over time, causing damage to the vehicle.

Over time, fuel caps have been devised to permit a gradual release of vapors into the atmosphere while the motorized object is in operation and to permit release of built-up pressure before removal of the fuel cap prior to refueling. Some have even incorporated filtering into the venting process during normal operation or to regulate or to relieve the maximum fuel pressures in a fuel tank to a predetermined limit. None, however, has incorporated a cleansing of ambient air into the fuel tank during operation nor incorporated a cleansing by absorption of pollutants and contaminants during cap removal as pressurized vapors are cleansed while they are expelled into the atmosphere.

The fuel cap described herein rises above all prior art fuel caps in that it accomplishes a bi-lateral cleansing by absorption of ambient air entering the fuel tank and cleansing by absorption of pollutants and contaminants from vapors being expelled during cap removal. The cap will force the user to clean any pressurized tank vapors through the cap during the cap removal process as the cap cannot be removed without first venting the vapors through the cap. This process will also greatly enhance personal safety during refueling since the cleansed vapors being expelled through the cap will now be virtually inflammable and provide the user with an added level of fire safety. And since the pressures in the tank will be relieved prior to cap removal, the chances of accidental fuel expulsion due to high tank pressures are greatly reduced.

Moreover, the fuel cap described herein also incorporates a sensor which detects the level of pollutants and contaminants absorbed thereby alerting the user when the absorption media has absorbed pollutants and contaminants to capacity at which time, the spent fuel cap and/or absorption media should be replaced.

Some of the pertinent objects of the presently described fuel cap include, but are not limited to:

a. Vapor cleansing by absorption of contaminants and pollutants in ambient air as ambient air enters the fuel tank during operation of the motorized object;

b. Vapor cleansing by absorption of contaminants and pollutants in fuel vapors in the fuel tank as they are expelled through the cap when the fuel cap is removed for refueling or inspection;

c. Providing a cleansing media by absorption suited to absorb contaminants and pollutants from ambient air and from expelled fuel vapors; and d. Incorporating a means to detect when the cleansing media has reached capacity of absorbed contaminants and pollutants.

The foregoing has outlined some of the more pertinent objects of the presently described fuel cap. These objects should be construed to be merely illustrative of some of the more prominent features and applications of the intended presently described fuel cap. Many other beneficial results can be attained by applying the disclosed fuel cap in a different manner or by modifying the presently described fuel cap within the scope of the disclosure. Accordingly, other objects and a fuller understanding of the presently described fuel cap may be had by referring to the summary of it and the detailed description of the preferred embodiment in addition to the scope of the presently described fuel cap defined by the claims taken in conjunction with the accompanying drawings.

BRIEF SUMMARY OF THE INVENTION

The above-noted problems, among others, are overcome by the presently described fuel cap. Briefly stated, the presently described fuel cap contemplates a bi-laterally filtering fuel cap for a fuel tank comprising a cap member having an internal chamber with a downward extending hollow tube in open communication with the internal chamber and in sealing communication with a lower hub bore; vents on side walls of the internal chamber; an absorption media inside the internal chamber and below the vents and above the hollow tube; a hub rotatably and slidably connected to the cap member with the hub having a lower hub bore into which the hollow tube is translatable for releasing vapors from the fuel tank as necessary before re-fueling whereby the vapors pass through the absorption media where they are cleansed and out the vents.

The foregoing has outlined the more pertinent and important features of the present fuel cap in order that the detailed description of the presently described fuel cap that follows may be better understood so the present contributions to the art may be more fully appreciated. Additional features of the present fuel cap will be described hereinafter which form the subject of the claims.

It should be appreciated by those skilled in the art that the conception and the disclosed specific embodiment may be readily utilized as a basis for modifying or designing other structures and methods for carrying out the same purposes of the present fuel cap. It also should be realized by those skilled in the art that such equivalent constructions and methods do not depart from the spirit and scope of the presently described fuel cap as set forth in the appended claims.

BRIEF DESCRIPTION OF THE DRAWINGS

For a fuller understanding of the nature and objects of the presently described fuel cap, reference should be had to the following detailed description taken in conjunction with the accompanying drawings in which.

DETAILED DESCRIPTION OF THE INVENTION

Figure 1:
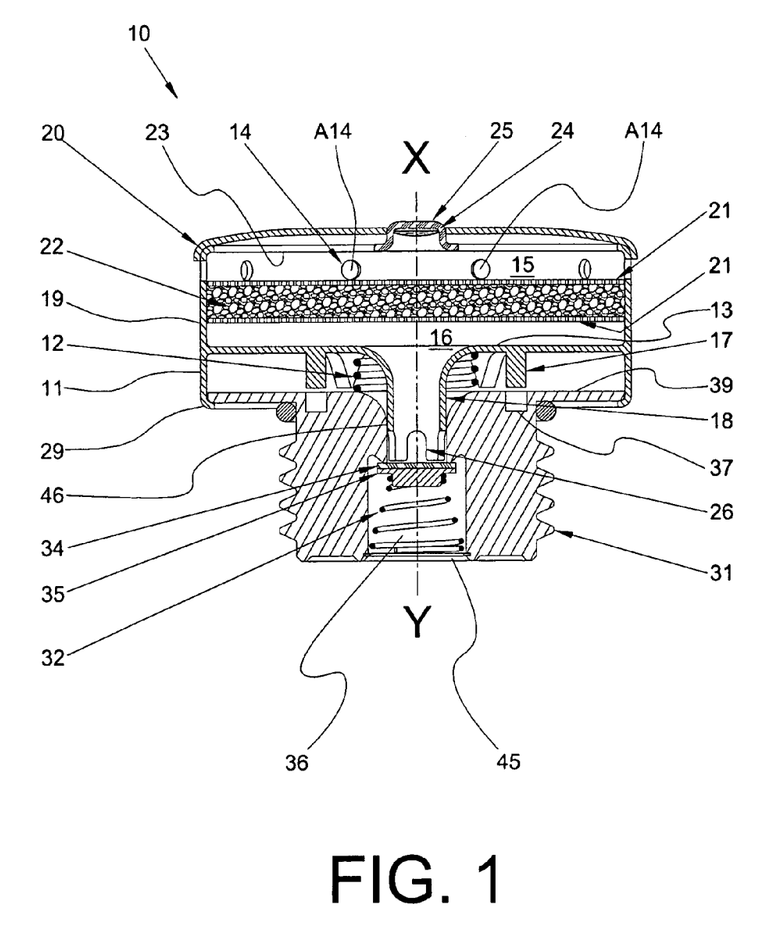
FIG. 1 is a cross sectional elevation view of the fuel cap in a static mode.

Referring now to the drawings in detail and in particular to FIG. 1, reference character 10 generally designates a fuel cap constructed in accordance with a preferred embodiment of the presently described fuel cap in a static or non-operational mode. It has an upper section, referred to herein as the cap member 11, and a lower section, referred to herein as the hub member 31.

The cap member 11 has an internal chamber 15 defined by a top 23, downward side wall 19, and a bottom 13. The side wall 19 extends downward past the bottom 13 having an inturned lip 29 (toward the axis x-y) at its terminis. An upper bias member 12, such as a compression spring, is in between the bottom 13 of the cap member 11 and the top ledge 39 of the hub member 31. The upward force of the upper bias member 12 on the bottom 13 and the downward force of the upper bias member 12 on the top ledge 39 force the lip 29 of the cap member 11 to engage the top ledge 39.

In this mode, the cap member 11, though rotatable, is not capable of turning the hub member 31 in order to remove the fuel cap 10 from the fuel tank (not illustrated) to which attached. If a user rotates the cap member 11 in this mode, it will merely rotate around the hub member 31 and have no other discernible effect; the fuel cap 10 cannot be removed from the fuel tank.

The internal chamber 15 has an absorption media or filtering media or cleansing media 22 therein and may, but need not have, a retaining member 21 above it or below it or both. This media 22 should generally cover the entire planar area of the internal chamber 15 from side-wall to side-wall and may be of any height as necessary.

The absorption media 22 could be comprised of a single compound or a combination of several compounds. The family for absorption media 22 for best results in this regard is activated carbon as derived from any source. Activated carbon is carbon that has been treated with oxygen to open up millions of tiny pores between the carbon atoms. This carbon media is commonly used in the removal and absorption of organic contaminants from vapor streams in pelletized, powder, and granular forms and, as such, is the preferred media for the absorption media 22.

The amount of absorption media used should be the maximum amount practicable within the available cap volume. In other words, the cap size limitations would be dictated by the amount of available space for the cap to occupy, and thus, limits the amount of absorption media. However, regardless of space constraints, for good results a minimum relative volume of between approximately 0.5 cubic inches to approximately 2.5 cubic inches of granular activated carbon media (or minimally equivalent media) should be utilized per cap whenever possible for acceptable results, though a relative minimum volume 1.5 cubic inches should provide better results.

The moisture content of the activated carbon media relatively should be approximately between 0.5%-5% when assembled for acceptable results, though 1% relative will provide better results. The density of the granular activated carbon should be generally in the range of about 27-32 lbs per cubic foot, relative, (0.40-0.50 grams per cubic centimeter) for best results, though 20-40 lbs per cubic foot, relative, will provide good results. For best results, the size of the granular activated carbon should be between approximately 1.0 to 2.0 mm though the size may range between about 0.25 to 4.0 mm and will provide good results.

The purpose of the absorption media 22 is to capture pollutants and contaminants (including moisture) as they enter the fuel cap 10 during operation as the pollutants and contaminants through the vents 14 on the side wall 19 and into the fuel tank (see FIG. 2, direction arrows A', A) and to capture pollutants and contaminants as they are released from the fuel tank and out the vents 14 as the fuel cap 10 is being removed for refueling (see FIG. 3, direction arrows B) which will be described in detail below.

The purpose of retaining members 21 are to keep the absorption media 22 in place while allowing vapor to move freely through the retaining members 21 and should possess qualities designed to assure a low pressure drop, that is, designed to breathe as easily with virtually no resistant to air flow. Retaining members 21 may be comprised of filter paper (similarly used in the common automotive air filter), a fine mesh screen material (woven or replete with holes of between approximately 0.25 mm to approximately 2.0 mm, though hole size of less than 1.0 mm will provide best results).

The bottom 13 of the internal chamber 15 also has a chamber bore 16 from which a hollow tube 18 extends downward. It is in sliding communication with the upper hub bore 46. Hollow tube 18 has an outer diameter such that it can telescope perfectly with the upper hub bore 46 and will prevent vapors from escaping between them. In this regard, the outer diameter of the hollow tube (18-OD) is nearly equal to, but less than, the inner diameter of the upper hub bore 46 (46-ID).

In the static mode illustrated in FIG. 1, the distal end of the hollow tube 18 is approximately co-planar with the terminis of the upper hub bore 46. One or more apertures or release channels 26 are at or near to the distal end of the hollow tube 18. A hub collar 41 [best seen in FIG. 4] at the bottom end of the upper hub bore 46 is where the bore ring 34 rests upon to seal the upper hub bore 46 and hollow tube 18 from the lower hub bore 36.

At the point where the upper hub bore 46 terminates, a lower hub bore 36, larger in diameter or width than the diameter or width of the upper hub bore 46, commences and runs downward to and through the distal end of the hub member 31 in free and open communication with the fuel tank and its vapors.

A lower bias member 32 is in the lower hub bore 36 and retained therein by a suitable securing member 45. At the top of the lower bias member 32 is a sealing component 34, 35 which because of the lower bias member 32 and in the static mode, is rested on the distal end of the hollow tube 18 and at the terminis of the upper hub bore 46 thereby sealing the lower hub bore 36 (and the fuel tank vapors) from the hollow tube 18 and the internal chamber 15 of the cap member 11.

This sealing component may be a bore seat 35 and a bore ring or a bore gasket 34 combination or any suitable sealing mechanism or components suited for the intended purpose of sealing as described above. The bore ring 34 may be rubber in nature as any rubbers, natural or manmade, used for this purpose, and should be resistant of liquid hydrocarbons and hydrocarbon vapor. The bore seat 35 may be made of a firm material and such material should be resistant to hydrocarbon. The purpose of the bore seat 35 is to support the bore ring 34 so that the bore ring 34 remains level and secure. The lower bias member 32 is attached to bore seat 35 and, in the static mode, exerts upward force upon the bore seat 35 and bore ring 34 to thereby prevent vapors in the fuel tank from escaping through the fuel cap 10. The lower securing member 45 secures the lower bias member 32 to the hub member 31 and inside the lower hub bore 36.

Figure 4:
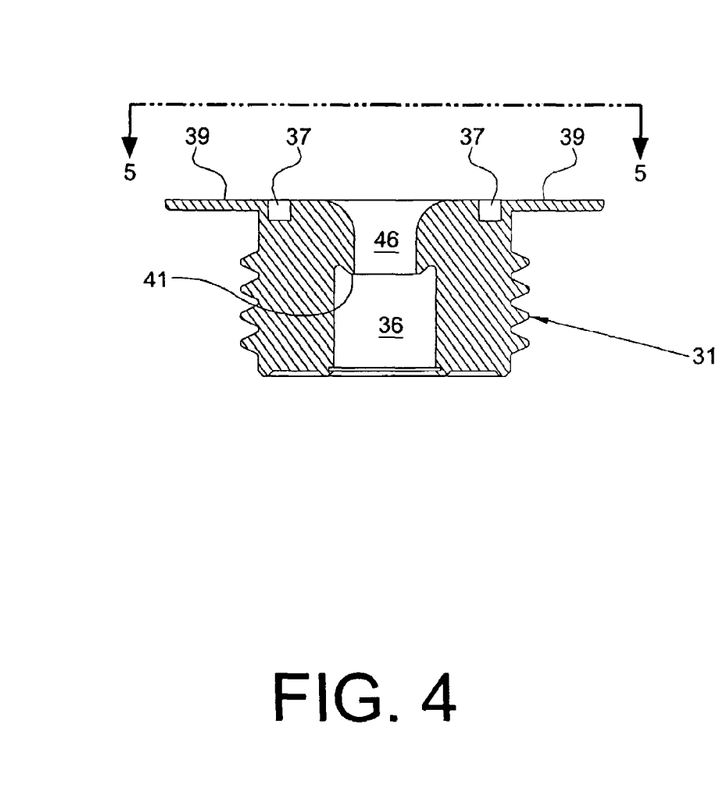
FIG. 4 is a cross section elevation view of the hub member as taken on line 4-4 of FIG. 5.

FIG. 4 illustrates the hub member 31 configuration in unobstructed detail without the lower bias member 32 and without the lower securing member 45 therefor. The respective bore widths 36, 46 are clearly illustrated. As illustrated in FIG. 4, and illustrated in greater detail in FIG. 5, the top ledge 39 of the hub member 31 has one or more hub registration members 37 which are adapted to engage, or be engaged by, corresponding cap registration members 17 extending downward of the bottom 13 of the cap member 11.

Figure 5:
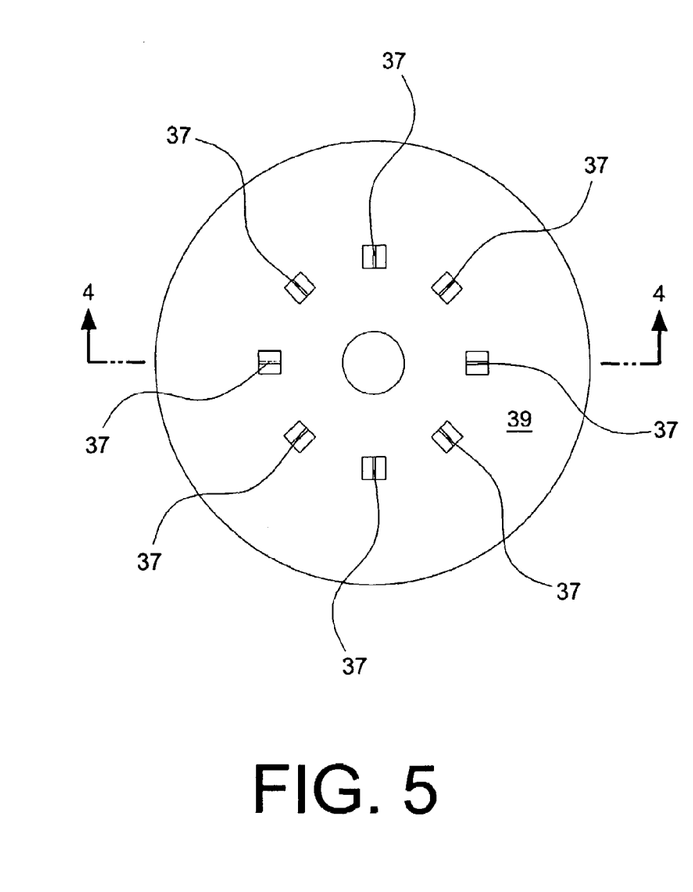
FIG. 5 is a top plan view of the hub member as taken on line 5-5 of FIG. 4.

The respective registration members 17, 37 may be extensions of any shape 17 on the bottom 19 of the cap member 11 with corresponding holes/indents 37 on the top ledge 39 of a shape adapted to receive the extensions 17; or the respective registration members 17, 37 may be extensions of any shape on the top ledge 39 of the hub member 31 with corresponding holes/indents on the bottom 19 of a shape adapted to receive the extensions; or any combinations thereof.

As the fuel cap 10 is so configured, the cap member 11 may be rotated and may be slid downward toward the hub member 31. If it is rotated without being slid downward, it will not have any discernable effect. If it is depressed and slid downward and simultaneously rotated, the respective registration members 17, 37 will engage thereby permitting the hub member 31 to be rotated in tandem with the cap member 11 and be removed for refueling.

Figure 2:
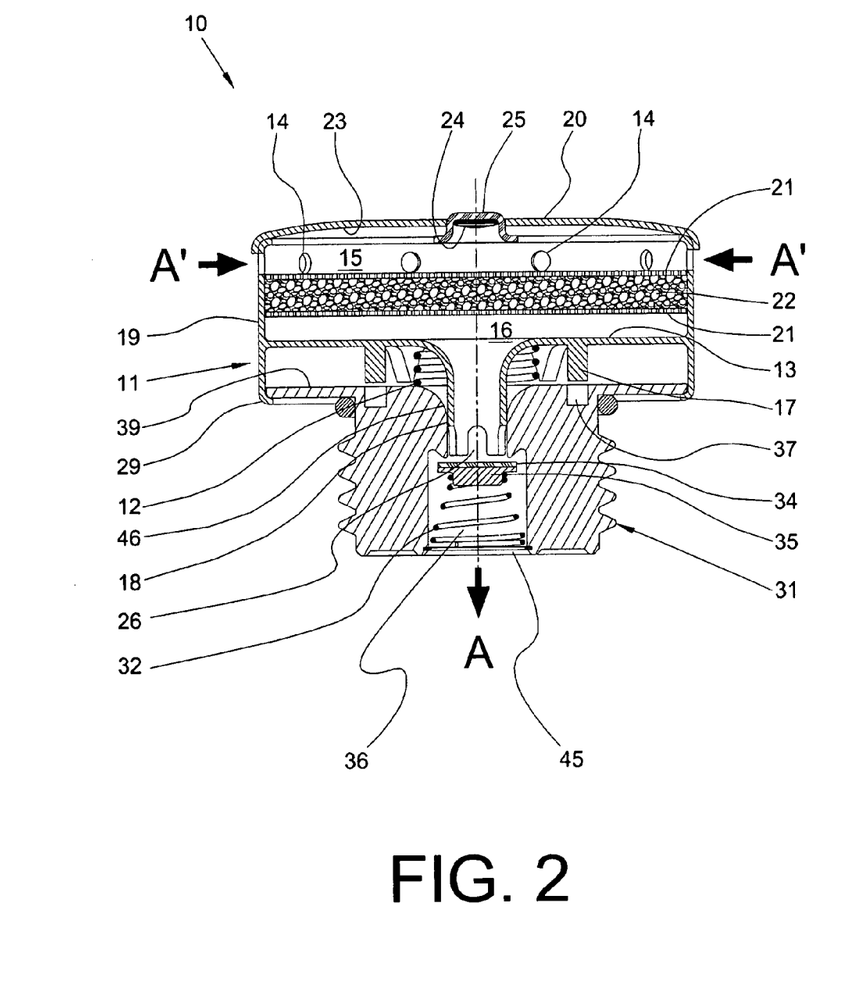
FIG. 2 is a cross section elevation view of the fuel cap in a negative tank pressure mode (i.e., tank sucking in air).

FIG. 2 illustrates the fuel cap 10 during operation of the motorized object while the fuel cap 10 is attached to the neck or filling component (not illustrated) of the motorized object. During operation, negative pressure is generated within the fuel tank. This negative pressure is sufficient to "suck" down, in the direction of arrow A, the sealing component 34, 35 on the lower bias member 32. The lower bias member 32 should be of such construction as to permit a constant compressive spring force which, while in the static state, should range between approximately 2.0 oz/inch to approximately 1.0 lb/inch, though a range of approximately between 4 to 6 oz/inch will provide better results. It must be understood that the required force will vary based on each individual cap design. The available range of motion of the lower bias member 32, from the static position as illustrated in FIG. 1 to the position shown in FIG. 3, should have a range of motion such that the release channels 26 may enter into the lower hub bore 36.

The tension on the upper bias member 12 is such that it prevents the cap member 11 from sliding downward without application of sufficient force in which to do so. In this regard, the upper bias member should be of such construction as to permit compression only upon application of between approximately 1.0 to 7.0 lbs/inch and should have a range of motion such that the release channels 26 may enter into the lower hub bore 36 when sufficient force is applied in which to do so.

During negative tank pressure conditions the lower bias member 32 is "sucked" open as illustrated in FIG. 2. During this process, the sealing component 34, 35 moves in tandem to expose the lower hub bore 36 to the hollow tube 18 and to thereby permit ambient air to enter the fuel tank through vents 14, passing through the absorption media 22, down through the chamber bore 16, through the hollow tube 18, into and through the lower hub bore 36, and ultimately the fuel tank. During passage of the ambient air through the absorption media 22, most, if not all, contaminants and pollutants (including moisture) are absorbed before entering the hollow tube 18 and the fuel tank.

As a user operates the motorized object, vapor pressures can, and do, build up in the gas tank. Typically, when a user removes a fuel cap, the pressure within the fuel tank is released and vapors escape into the environment. The presently described fuel cap 10 is constructed to capture/absorb the pollutants and contaminants before they can be released into the environment.

Figure 3:
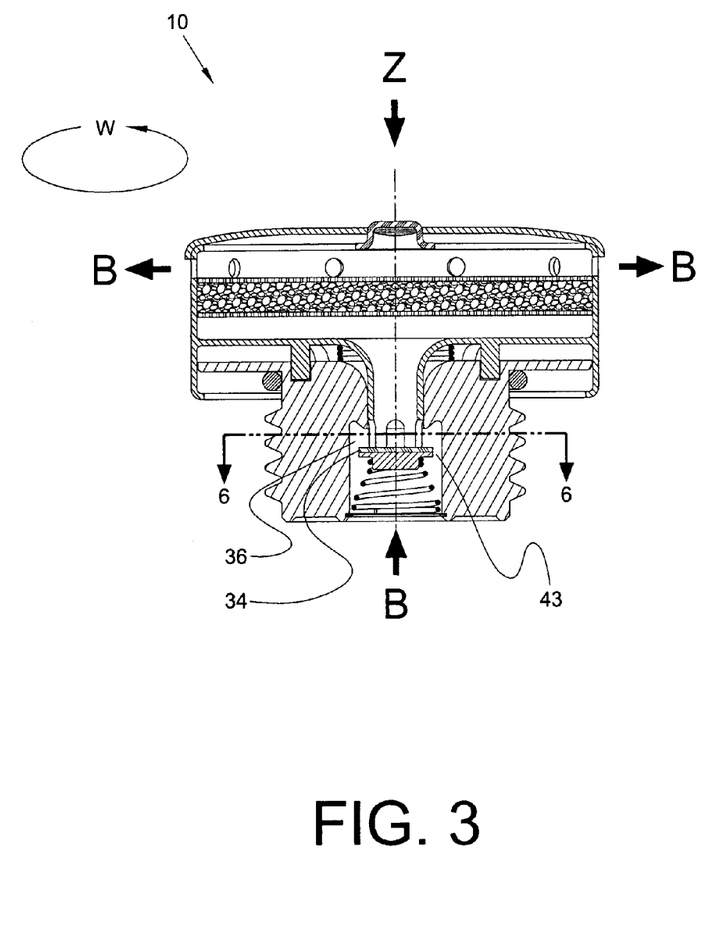
FIG. 3 is a cross section elevation view of the fuel cap in a physically compressed pre-fueling/cap removal mode.

FIG. 3 represents the fuel cap 10 during the pre-refueling/cap removal mode. Before the fuel cap 10 may be removed, the user must first engage the respective registration member 17, 37 by depressing the cap member 11 in the direction of arrow Z while simultaneously, or nearly simultaneously, rotating the cap member 11 either in a clockwise direction or in a counter-clockwise direction.

Once the registration components 17, 37 are properly engaged the fuel cap 10 may be properly rotated, typically in a counter-clockwise direction (arrow W) to unscrew and remove the fuel cap 10. Pressing the cap member 11 in the direction of arrow Z pushes the hollow tube 18 and the sealing component 34, 35 downward in tandem. This movement pushes the release channels 26 downward past the terminus of the upper hub bore 46 and into the lower hub bore 36 thereby opening the line of communication from the fuel tank to the inner chamber 15.

In this mode, fuel vapors and its pollutants and contaminants migrate in the direction of arrow B into the lower hub bore 36, through the release channels 26, up the hollow tube 18, into the internal chamber 15 and into the absorption media 22 for absorption/cleansing, and ultimately out the vents 14 into the environment.

Figure 6:
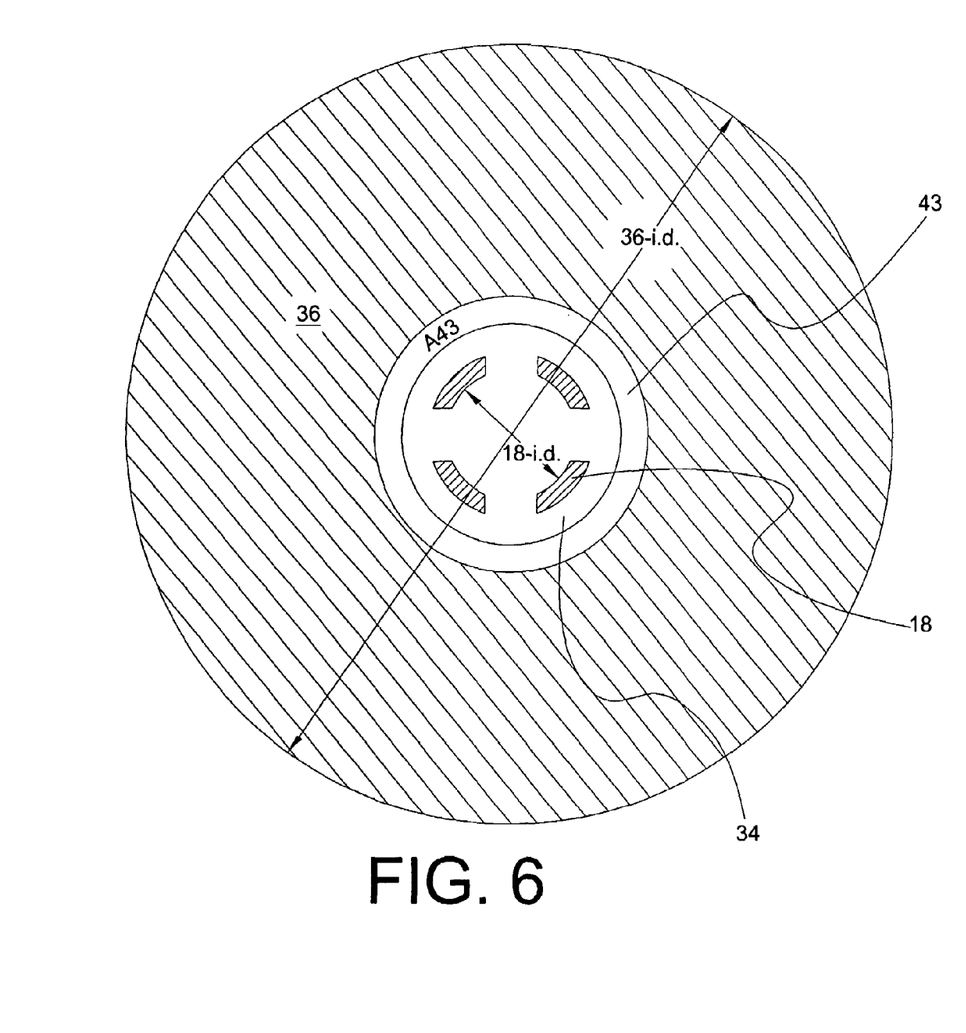
FIG. 6 is a cross-section detailed view of the lower hub bore and hollow tube illustrating the respective areas as taken on line 6-6 of FIG. 3.
Figure 7:
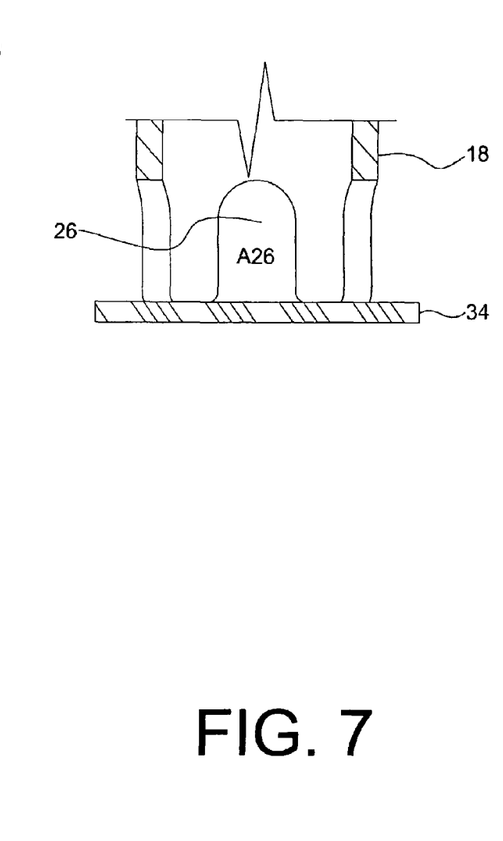
FIG. 7 is a detailed view of the release channel of the hollow tube.

Dimensions and areas of openings are important to a more efficient fuel cap 10 described herein and reference is now made to FIGS. 6 and 7 for this purpose. In FIG. 6, an air ring 43 is defined between the outer perimeter of the bore ring 34 and the inner diameter (36-ID) of the lower hub bore 36. The transverse or linear area of the air ring 43 is represented by reference character A43 and would resemble a standard flat hardware washer with the solid portion being the air ring.

The area of the linear circle formed by the inner diameter (18-ID) of the hollow tube 18 is represented by reference character A18. Such a linear circle would resemble a flat thin wafer having a surface area A18. For best flow and, therefore, best cleansing results, A18 must be approximately equal to A43.

The area of the opening of each release channel 26 (see FIG. 7) is represented by reference character A26. It must be understood that there may be more than one such release channel 26 but there should be at least one. Where 'nc' represents the total number of release channels 26, A18 should also be approximately equal to (nc)×(A26). Lastly, each vent 14 also has an area representing its opening as represented here by reference character A14. The combined total of area for all vents 14 should be approximately twice that of A18. Therefore, where 'nv' represents the total number of vents 14, then:

$$(nv) \times (A14) \approx (A18) \times (2); \text{ or } A14 \approx (A18) \times (2) \div (nv)$$

As described above, generally granular activated carbon is preferred as the absorption media 22 because it had been treated with oxygen to open up millions of tiny pores between the carbon atoms. Through the use of special manufacturing techniques, the carbon granules are highly porous and can have surface areas ranging between 300 to 2,000 square meters per gram. When this type absorption media 22 absorbs a contaminate, it attaches to it by chemical attraction. The huge surface area of the granular activated carbon gives it countless bonding sites. When certain chemicals pass next to the carbon surface, they attach to the surface and are trapped. Once all of the bonding sites are filled, the absorption media 22 becomes saturated and must be replaced.

Another important feature of the presently described fuel cap 10 is a contaminant detector or sensor 24. It may be at or near the lid 20 of the cap member 11 or at any location provided it is visible to the user and it is above the absorption media 22. As illustrated, the sensor 24 is between the lid 20 and the top 23 of the chamber 15. Also, as illustrated, a window 25 above the sensor 24 covers the sensor 24 but permits viewing of the sensor 24 to determine if, when, the absorption media 22 is saturated or its efficient diminished such that the fuel cap 10 and/or absorption media 22 should be replaced.

Before the absorption media 22 reaches a saturated state, the sensor 24 is isolated from contamination because vapor flowing into the area above the absorption media 22 is cleansed vapor. The vapor is flowing into this area and over and around the sensor 24 before exiting the cap through the vents 14, but since that vapor has been cleansed it has no effect on the sensor 24. However, when the absorption media 22 becomes saturated, the subsequent passing vapors will no longer be cleansed by absorption media 22 and will effect the sensor 24. This condition will then cause the sensor 24 to become contaminated as the contaminated vapor communicates with the sensor 24 before exiting through the vents 14.

When the sensor 24 thus becomes contaminated, the sensor 24 will visually change state by chemical processes. This sensor 24 may be rendered in many forms suited for the intended purpose. I have found that a commercially available paste-like material that is thinly applied to the window 25 provides excellent sensing results. Then, as contaminated vapors communicate with the sensor 24, the sensor 24 visually changes state by changing color or showing areas of demarcation (areas of discoloration). This visual change of state alerts the user that the cap has absorbed it capacity of contaminants and should be replaced.

An existing industrial product, generally referred to as Gasoline Gauging Paste or Gasoline Finding Paste (a semi-solid), well serves the purposes of the sensor 24. Current manufacturers of Gasoline Gauging Paste suited for this sensor 24 include, but are not limited to, Color Kut Products Company, LTD; Gasoila (a Division of Federal Process Corporation); and McCabe and Sons, Inc.

The present disclosure includes that contained in the present claims as well as that of the foregoing description. Although this fuel cap has been described in its preferred forms with a certain degree of particularity, it is understood that the present disclosure of the preferred forms has been made only by way of example and numerous changes in the details of construction and combination and arrangement of parts and method steps may be resorted to without departing from the spirit and scope of the presently described fuel cap. Accordingly, the scope of the presently described fuel cap should be determined not by the embodiments illustrated, but by the appended claims and their legal equivalents.

What is claimed is:

1. A bi-laterally cleansing fuel cap for a fuel tank comprising:
   (a) a cap member having a top, a bottom, and a side wall attached to said top and to said bottom defining an internal chamber therein and a chamber bore through said bottom with a downward extending hollow tube in communication with said internal chamber;
   (b) one or more vents on said side wall with an absorption media inside said internal chamber;
   (c) a hub member rotatably and slidably connected to said cap member, said hub member having a ledge on top and a lower hub bore in releasably sealing communication with said hollow tube and in open communication with the fuel tank;
   (d) a lower bias member inside said lower hub bore exerting sealing force between said lower hub bore and said hollow tube; and
   (e) a sealing member on top of said lower bias member in sealing communication with said hollow tube;
whereby as a vehicle having said fuel cap attached is in operation, the negative pressures generated in the fuel tank forces the sealing member open, ambient air enters the fuel tank via said one or more vents, passes through said absorption media capturing contaminants, down through said chamber bore, around said sealing member, through said lower hub bore, and into the fuel tank.

2. The fuel cap as claimed in claim 1 further comprising releasing means for relieving built-up pressure in the fuel tank prior to removal of said fuel cap.

3. The fuel cap as claimed in claim 2 wherein said releasing means comprises one or more release channels, each having an orifice with a predetermined area, on said hollow tube and adjacent to said sealing member and an upper bias member in between said bottom of said cap member and said hub member whereby as downward force is exerted on said cap member, said upper bias member yields thereby permitting said cap member and said hollow tube to slide downward and to push said sealing member and said one or more release channels into said lower hub bore thereby allowing contaminants and pollutants in pressurized fuel vapors to migrate upward through said lower hub bore, past said one or more release channels, through said cap bore, through said absorption media thereby capturing contaminants and pollutants thereat, and out said one or more vents.

4. The fuel cap as claimed in claim 3 wherein said upper bias member has a pressure ranging from approximately 1.0 pounds/inch to approximately 7.0 pounds/inch.

5. The fuel cap as claimed in claim 3 wherein an air gap is defined in a space between a circumference around an inner diameter of said lower hub bore and a circumference around said sealing member wherein said air gap has a predetermined air gap area.

6. The fuel cap as claimed in claim 5 wherein said air gap area is approximately equal to a hollow tube inner linear area defined by an inner diameter of said hollow tube.

7. The fuel cap as claimed in claim 6 wherein each of said one or more vents has a predetermined area for its opening and a combined total area of said opening of said one or more vents is approximately twice the inner linear area of said hollow tube.

8. The fuel cap as claimed in claim 5 wherein said hollow tube inner linear area is approximately equal to a combined total area of said orifices of said one or more release channels of said hollow tube.

9. The fuel cap as claimed in claim 1 further comprising sensor means for detecting when said absorption media has become saturated with contaminants and pollutants.

10. The fuel cap as claimed in claim 9 wherein said sensor means further comprises a view member on said fuel cap and adjacent to said sensor.

11. The fuel cap as claimed in claim 1 further comprises a registration means for registering said cap member to said hub member when said cap member is pushed downward into said hub member thereby permitting said cap member and said hub member to be rotated in tandem and be removed from the fuel tank.

12. The fuel cap as claimed in claim 11 wherein said registration means comprises one or more indents on said ledge and one or more cooperating extensions on said bottom of said cap member.

13. The fuel cap as claimed in claim 1 wherein said absorption media comprises an activated carbon compound in pelletized, powder, or granular form.

14. The fuel cap as claimed in claim 1 wherein said lower bias member has a pressure ranging from approximately 2.0 ounces/inch to approximately 1.0 pound/inch.

* * * * *